(12) United States Patent
Van Der Sijde et al.

(10) Patent No.: US 11,236,870 B2
(45) Date of Patent: Feb. 1, 2022

(54) ILLUMINATOR HAVING COMBINATION REFRACTIVE AND TIR LENS

(71) Applicant: Lumileds LLC, San Jose, CA (US)

(72) Inventors: Arjen Gerben Van Der Sijde, Eindhoven (NL); Nicola Bettina Pfeffer, Eindhoven (NL)

(73) Assignee: Lumileds LLC, San Jose, CA (US)

( * ) Notice: Subject to any disclaimer, the term of this patent is extended or adjusted under 35 U.S.C. 154(b) by 0 days.

(21) Appl. No.: 17/066,132

(22) Filed: Oct. 8, 2020

(65) Prior Publication Data

US 2021/0404611 A1 Dec. 30, 2021

Related U.S. Application Data

(60) Provisional application No. 63/044,227, filed on Jun. 25, 2020.

(51) Int. Cl.
| | |
|---|---|
| *F21K 9/69* | (2016.01) |
| *F21V 5/04* | (2006.01) |
| *G02B 27/30* | (2006.01) |
| *G02B 3/08* | (2006.01) |
| *G02B 19/00* | (2006.01) |
| *F21Y 115/10* | (2016.01) |
| *F21Y 105/16* | (2016.01) |
| *F21V 7/00* | (2006.01) |

(52) U.S. Cl.
CPC ............... *F21K 9/69* (2016.08); *F21V 5/045* (2013.01); *F21V 5/046* (2013.01); *G02B 3/08* (2013.01); *G02B 19/0066* (2013.01); *G02B 27/30* (2013.01); *F21V 7/0091* (2013.01); *F21Y 2105/16* (2016.08); *F21Y 2115/10* (2016.08)

(58) Field of Classification Search
CPC ...................................................... F21V 5/046
See application file for complete search history.

(56) References Cited

U.S. PATENT DOCUMENTS

| | | | |
|---|---|---|---|
| 10,883,700 B2* | 1/2021 | Okahisa | ............... F21V 5/045 |
| 2005/0024746 A1* | 2/2005 | Shimura | ............... F21V 5/045 |
| | | | 359/742 |
| 2005/0201101 A1* | 9/2005 | Shimura | ............... G11B 7/1353 |
| | | | 362/330 |
| 2008/0106804 A1* | 5/2008 | Ieda | ..................... G02B 3/08 |
| | | | 359/708 |

(Continued)

*Primary Examiner* — Alan B Cariaso
(74) *Attorney, Agent, or Firm* — Schwegman Lundberg & Woessner, P.A.

(57) ABSTRACT

In an illumination system, a lens can substantially collimate light that is emitted from a location on a light source. The emitted light can have a central light portion and a peripheral light portion. The lens can have a first surface that faces the light source and a second surface opposite the first surface. The first surface can include a first convex central portion and a first total internal reflection (TIR) portion. The second surface can include a second convex central portion and a second TIR portion. The first and second convex central portions can substantially collimate the central light portion via refraction at the first convex central portion and refraction at the second convex central portion. The first and second TIR portions can substantially collimate the peripheral light portion via total internal reflection at the first TIR portion and total internal reflection at the second TIR portion.

18 Claims, 4 Drawing Sheets

(56) References Cited

U.S. PATENT DOCUMENTS

| | | | |
|---|---|---|---|
| 2013/0270585 A1* | 10/2013 | Mei | H01L 25/0753 |
| | | | 257/89 |
| 2015/0009677 A1* | 1/2015 | Catalano | F21V 7/06 |
| | | | 362/296.07 |
| 2016/0116723 A1* | 4/2016 | Hukkanen | G02B 6/0016 |
| | | | 362/329 |
| 2018/0192484 A1* | 7/2018 | Stopa | F21V 13/04 |

* cited by examiner

ILLUMINATOR HAVING COMBINATION REFRACTIVE AND TIR LENS

CROSS-REFERENCE TO RELATED APPLICATION

This application claims the benefit of U.S. Provisional Application No. 63/044,227, filed Jun. 25, 2020, which is hereby incorporated by reference in its entirety.

FIELD OF THE DISCLOSURE

The present disclosure relates generally to illumination using light-emitting diodes (LEDs).

BACKGROUND OF THE DISCLOSURE

Because LEDs are more efficient and more compact than comparable incandescent bulbs or fluorescent lights, LEDs are increasingly used in lighting applications. For example, LEDs are used as light sources, such as flash devices, in electronic devices, such as cameras and smart phones.

BRIEF DESCRIPTION OF THE DRAWINGS

Corresponding reference characters indicate corresponding parts throughout the several views. Elements in the drawings are not necessarily drawn to scale. The configurations shown in the drawings are merely examples and should not be construed as limiting in any manner.

DETAILED DESCRIPTION

Figure 1:
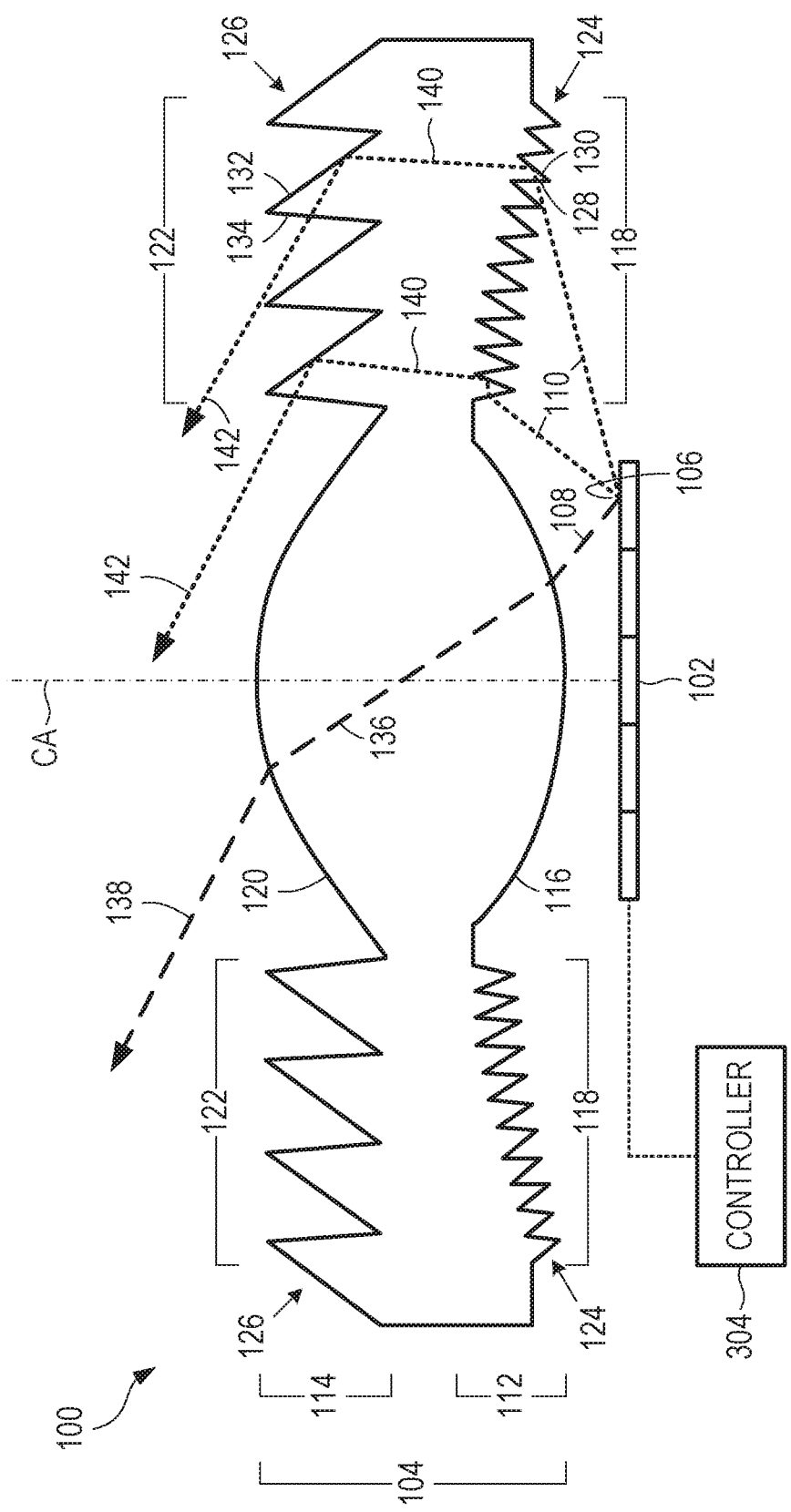
FIG. 1 shows a cross-sectional side view of an example of an illumination system, in accordance with some embodiments.

In an LED-based illumination system, a lens can collimate or at least partially focus light emitted from one or more LEDs. Some illumination systems, such as a flash for a camera, can require that the collimated or at least partially focused light cover a relatively wide field of view (FOV). For example, for a smartphone-based camera and flash, in which the camera has a full-angle field of view, the camera flash can provide illumination that extends over the full-angle field of view of the camera. A typical full-angle field of view for a smartphone-based camera can be up to 120 degrees or larger.

A typical refraction-based imaging lenses can be unsuitable for use in illumination systems, such as to collimate or at least partially focus light from one or more LEDs. For example, because an imaging lens is typically designed to form a high-quality image of a scene in the field of view of the imaging lens, such an imaging lens can be relatively large, relatively expensive, and may have relatively poor efficiency (e.g., relatively high loss due to reflection and/or scattering) at relatively high field of view angles.

In contrast with a typical imaging lens, an illumination system lens can be designed to direct as much of the LED-emitted light as possible (or as practical) into an illuminating beam that emerges from the illumination system lens. In particular, the imaging lens can utilize total internal reflection (TIR) to increase the efficiency (e.g. reduce or eliminate loss due to reflection and/or scattering) at relatively high field of view angles.

An illumination system, as described in detail below, can include a light source that extends over an area, a lens that can substantially collimate or at least partially focus light emitted from the light source to produce emerging light, and an optional controller that can control an angular output of the emerging light (e.g., a variation in brightness as a function of angle) by controlling a brightness of the light source as a function of area of the light source. The lens, as described in detail below, can utilize total internal reflection to increase its efficiency at relatively high field of view angles.

In an example of an illumination system, a lens can substantially collimate light that is emitted from a location on a light source. The emitted light can have a central light portion and a peripheral light portion. The lens can have a first surface that faces the light source and a second surface opposite the first surface. The first surface can include a first convex central portion and a first TIR portion. The second surface can include a second convex central portion and a second TIR portion. The first and second convex central portions can substantially collimate the central light portion via refraction at the first convex central portion and refraction at the second convex central portion. The first and second TIR portions can substantially collimate the peripheral light portion via total internal reflection at the first TIR portion and total internal reflection at the second TIR portion.

Figure 2:
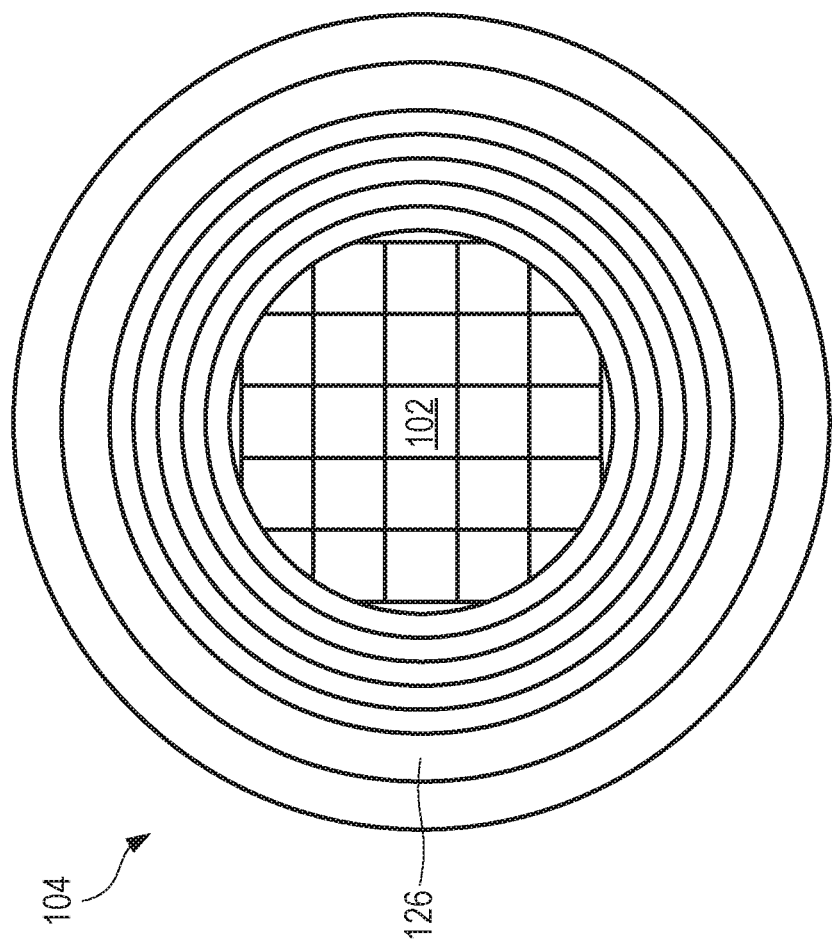
FIG. 2 shows an end-on view of the illumination system of FIG. 1, in accordance with some embodiments.

FIG. 1 shows a cross-sectional side view of an example of an illumination system 100, in accordance with some embodiments. FIG. 2 shows an end-on view of the illumination system 100 of FIG. 1, in accordance with some embodiments. The illumination system 100 can include a light source that extends over an area, a lens that can substantially collimate or at least partially focus light emitted from the light source to produce emerging light, and an optional controller that can control an angular output of the emerging light by controlling a brightness of the light source as a function of area of the light source.

A light source 102 can emit light. In some examples, the light source 102 can be an extended light source, which can emit light over an emission area that is typically significantly larger than a wavelength of the emitted light. For example, a light-emitting diode can emit light having a wavelength smaller than 1 µm, and can have an emission area that can be 1 mm on a side, or larger. (In contrast, light sources that are not extended light sources can emit light from a point source, or from an area or a virtual area that is sized on the order of the wavelength, such as a laser diode, or a single-mode fiber.) In some examples, the light source 102 can include an array of light-emitting diodes. The array of light-emitting diodes can optionally be disposed on a single substrate. In other examples, the light-emitting diodes can be disposed on different, independent substrates, on which the light-emitting diodes are formed. In some examples, each light-emitting diode in the array can be controlled independently of the other light-emitting diodes in the array. For example, a light-emitting diode can receive a specified current, and in response, can emit light from an emission surface of the light-emitting diode. The emission surface can extend over an emission area. The emission from each location in the emission area can have a Lambertian angular profile (e.g., can vary cosinusoidally as a function of emission angle, with respect to a surface normal of the emission area). The emission can be uniform or substantially uniform from location-to-location across the emission area of an individual light-emitting diode of the array of light-emitting diodes. In some example, the array of light-emitting diodes can be an array of white light-emitting diodes. For example, the array of white light-emitting diodes can produce excitation light having an excitation wavelength, which can optionally be in a blue or violet portion of the visible spectrum, and can include a phosphor that can absorb some or all of the excitation light and can emit phosphor light at wavelengths that are longer than the excitation wavelength. Other light sources can also be used.

A lens 104 can substantially collimate light that is emitted from a location 106 on the light source 102. In some examples, the lens 104 can have a focal plane, and the light source 102 can be disposed at, substantially at, or proximate the focal plane of the lens 104. For the purposes of this document, the phrase "substantially at" is intended to signify that an element is placed to within typical fabrication and alignment tolerances. Such tolerances are readily known to one of ordinary skill in the art, and can vary from application-to-application or system-to-system. Similarly, the term "proximate" is intended to signify that an element is placed to within 50%, 25%, 10%, or 5% of a focal length of the lens.

For the purposes of discussion below, it is instructive to examine light from a single location 106 on the emission area of the light source 102. For example, the lens 104 can collimate or substantially collimate the light from the single location 106, such that light from the single location 106 on the light source 102 emerges from the lens 104 at a single output angle or a (relatively small range of output angles), and can form a beam that has a cross-sectional size that remains constant or generally constant as it propagates away from the lens 104. It will be understood that light emerging from a different location on the emission area of the light source 102 may also be collimated or substantially collimated, and can also form a beam that has a cross-sectional size that remains constant or generally constant as it propagates away from the lens 104, but will emerge from the lens 104 at a different output angle (or relatively small range of output angles). Light emitted from the full surface area of the light source 102 may be considered to be a superposition of light emitted from individual locations on the surface area. Consequently, the collimated output of light from the full surface area may be considered to be a superposition of beams of generally constant cross-sectional size, all propagating with different directions away from the lens 104. By controlling which portions of the full surface area emit light, and how bright such emission is, the system 100 can control which directions away from the lens 104 (e.g. which portions of a field of view of the lens 104) receive illuminating light and how much illuminating light is delivered. In other words, controlling which light-emitting diodes are electrically powered, how much current is delivered to each light-emitting diode, and how such quantities evolve over time, can determine a time-evolving angular distribution of light emerging from the lens 104. While discussion below involves emission from only a single location 106 on the light source 102, it will be understood that emission from other locations on the light source 102 can simultaneously (and/or time-sequentially) contribute to the time-evolving angular distribution and/or the time-evolving full angular field of view output of the illumination system 100.

The light emitted from the location 106 on the light source 102 can have a central light portion 108 and a peripheral light portion 110 adjacent to the central light portion 108. As explained below, the central light portion 108 can be collimated or substantially collimated via refraction at a central portion of the lens 104, while the peripheral light portion 110 can be collimated or substantially collimated via total internal reflection at a peripheral portion of the lens 104. At a center of the light source 102, the peripheral light portion 110 can optionally surround the central light portion 108.

The lens 104 can have a first surface 112 configured to face the light source 102 and a second surface 114 opposite the first surface 112.

The first surface 112 can include a first convex central portion 116 and a first TIR portion 118 adjacent to the first convex central portion 116. The second surface 114 can include a second convex central portion 120 and a second TIR portion 122 adjacent to the second convex central portion 120. In some examples, the first TIR portion 118 can surround the first convex central portion 116. In some examples, the second TIR portion 122 can surround the second convex central portion 120. In some examples, the central portion(s) can be directly adjacent to the TIR portion(s). In some examples, the central portion(s) can be separated from the TIR portion(s) by one or more flat or curved portions.

The first convex central portion 116 and second convex central portion 120 can be shaped to substantially collimate the central light portion 108 via refraction at the first convex central portion 116 and refraction at the second convex central portion 120. Using such a biconvex configuration can allow the lens 104 to be thinner than comparable plano-convex or meniscus (convex-concave) configurations.

In some examples, the first convex central portion 116 and the second convex central portion 120 can each have a radius of curvature, R, as determined by the following equation:

$$\tan\frac{\theta}{2} = \sqrt{2}\,\frac{n-1}{n}\,\frac{x}{R},$$

where quantity θ is an angular full field of view (such that θ equaling 180 degrees corresponds to a field of view extending over a full angular range on one side of a plane), quantity n is a refractive index of the lens 104, and quantity x is a length of the array of light-emitting diodes (such as a full length along an edge of the array, a half-length along an edge of the array, a full length of a diagonal of the array, or a half-length of a diagonal of the array). In some examples, quantity R can be greater than or equal to quantity $x/\sqrt{2}$. For these conditions, for a refractive index of 1.5 and purely spherical convex surfaces, the largest field of view that can be handled by the lens 104 is about 70 degrees. The field of view can be increased, beyond that can be attained by purely spherical surfaces, by imparting a non-zero conic constant to the first convex central portion 116 and the second convex central portion 120. For example, the conic constant of one or both of the first convex central portion 116 and the second convex central portion 120 can be less than or equal to −0.5.

In some examples, the first convex central portion 116 can have a radius of curvature between about 0.5 mm and about 3.0 mm and can have a conic constant less than or equal to −0.5. In some examples, the second convex central portion 120 can have a radius of curvature between about 0.5 mm and about 3.0 mm and can have a conic constant less than or equal to −0.5. In some examples, using these numerical values can accommodate fields of view of about 80 degrees to about 120 degrees.

In some examples, the light source 102 can be rectangular or square. In examples, the light source 102 can include a first length along a first edge of the light source 102, a second length along a second edge of the light source 102 that is adjacent to the first edge of the light source 102, and a diagonal length extending diagonally across the light source 102. In some examples, the first length and the second length can be less than an outer diameter of the first convex central portion 116 and less than an outer diameter of the second convex central portion 120. In some examples, the diagonal length can be greater than the outer diameter of the first convex central portion 116 and greater than the outer diameter of the second convex central portion 120.

In some examples, a central axis (CA) of the lens 104 can extend through a center of the first convex central portion 116 and a center of the second convex central portion 120. In some examples, the lens 104 can be rotationally symmetric about the central axis.

The first TIR portion 118 and the second TIR portion 122 can be shaped to substantially collimate the peripheral light portion 110 via total internal reflection at the first TIR portion 118 and total internal reflection at the second TIR portion 122.

In some examples, the first TIR portion 118 can have a cross-section, taken in a plane that includes the central axis, that includes a plurality of first serrations 124. Similarly, in some examples, the second TIR portion 122 can have a cross-section, taken in the plane, that includes a plurality of second serrations 126. Such serrations can allow the lens 104 to be thinner than if the serrations were not present, such as to achieve the same lensing effect.

In some examples, a first serration of the plurality of first serrations 124 can include a first apex and a first pair of opposing sides 128, 130 that each extend from the first apex toward the second surface 114 of the lens 104. The first pair of opposing sides can be angled such that light in the peripheral light portion 110 enters the lens 104 via refraction at a first opposing side 128 of the first pair of opposing sides and is directed toward the second TIR portion 122 via total internal reflection at a second opposing side 130 of the first pair of opposing sides. In some examples, the plurality of first serrations 124 can include apexes that lie on a virtual surface that is concave when viewed in the cross-section.

In some examples, a second serration of the plurality of second serrations 126 can include a second apex and a second pair of opposing sides that each extend from the second apex toward the first surface 112 of the lens 104. The second pair of opposing sides can be angled such that light in the peripheral light portion 110 reflects via total internal reflection at first opposing side 132 of the second pair of opposing sides and is directed out of the lens 104 via refraction at a second opposing side 134 of the second pair of opposing sides. In some examples, the plurality of second serrations 126 can include apexes that lie on a virtual surface that is generally planar when viewed in the cross-section.

The first convex central portion 116 can direct, via refraction at the first convex central portion 116, the central light portion 108 toward the second convex central portion 120 as central internal light 136. The second convex central portion 120 can direct, via refraction at the second convex central portion 120, the central internal light 136 out of the lens 104 to form central exiting light 138. The first TIR portion 118 can reflect, via total internal reflection at the first TIR portion 118, the peripheral light portion 110 toward the second TIR portion 122 as peripheral internal light 140. The second TIR portion 122 can reflect, via total internal reflection at the second TIR portion 122, the peripheral internal light 140 to form peripheral exiting light 142 that exits the lens 104 and is substantially parallel to the central exiting light 138.

A controller 304 can selectively power the light-emitting diodes of the array, where the light-emitting diodes of the array can be individually addressable. For example, the controller 304 can specify which light-emitting diodes of the array are electrically powered, how much current is to be delivered to each light-emitting diode, and how such quantities evolve over time. In some examples, the controller 304 can select from one of a specified plurality of subsets of the light-emitting diodes, the subsets corresponding to different angular distributions of the central light portion 108 and the peripheral light portion 110. The controller 304 is discussed in further detail below with regard to FIG. 3.

Figure 3:
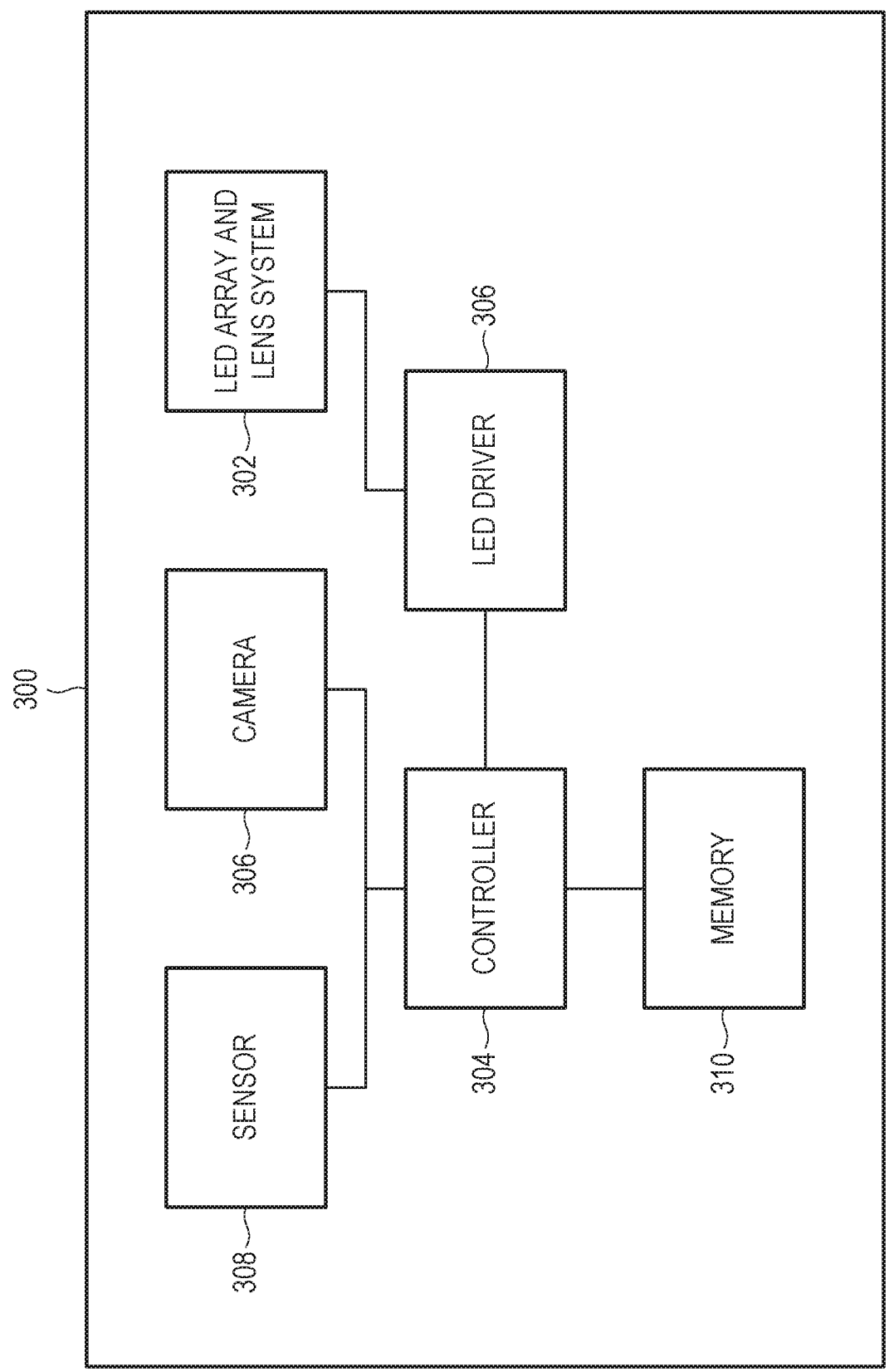
FIG. 3 shows an example of a camera and flash system, in accordance with some embodiments.

FIG. 3 shows an example of a camera and flash system 300, in accordance with some embodiments. The system 300 can be a specialized light source, such as a flash, a flashlight, or a room light. The system 300 can be part of a communication or computing device, such as a smart phone, a tablet, a laptop computer. The system 300 can be included as part of another device, such as a digital camera or smart phone. The LED array and lens system 302 can be similar to the foregoing described configurations and may include multiple sets of LEDs driven by an LED driver 306 that is controlled by a controller 304, such as a microprocessor. In some examples, a flash system for a mobile device can include a camera having a FOV that is used in cooperation with a flash assembly including a composite lens having a central refractive lens and a surrounding retroreflector section that together have a FOV that matches the camera FOV. An array of light emitting elements can be positioned below the composite lens and capable of illuminating an area.

In some examples, the controller 304 can be coupled to a camera 306 and sensors 308. The controller 304 can operate in accordance with instructions and profiles stored in a memory 310. In some examples, the system 300 can include modules that allow wirelessly communicating via Bluetooth, Wi-Fi. LTE, or any other communication protocol using RF transceiver circuitry. In some examples, the system may lack the RF transceiver circuitry or otherwise lack the ability to wirelessly communicate with other electronic devices using a communication protocol.

The driver 306 can be formed, for example, using either an analog-driver approach or a pulse-width modulation (PWM)-driver approach. When an analog driver is used, all LED sets that are driven together may be driven simultaneously. Each LED or LED set may be driven independently by providing a different current for each LED or LED set. In a PWM driver, each LED or LED set may be switched on, in sequence, at high speed and driven with substantially the same current. For a multi-color light source, specifying a variation of the duty cycle of each color can control the color of the light output. In some examples, a voltage-controlled current source can supply the current.

In some examples, the controller 304 can control the amount of current supplied and/or the duty cycle. The controller 304 can be a microprocessor that includes, for example, an application processor (e.g., a chip used for the primary processing of cellular phone and other smart functions) and a baseband processor (e.g., a chip that handles background functions such as running the display, handling wireless communications and managing power drain). Sensors 308 may include, for example, positional sensors (e.g., a gyroscope and/or accelerometer) and/or other sensors that may be used to determine the position, speed, and orientation of system 300. The signals from the sensors 308 may be supplied to the controller 304 to be used to determine the appropriate course of action of the controller 304 (e.g., which LEDs are currently illuminating a target and which LEDs will be illuminating the target a predetermined amount of time later).

The memory 310 can be nonvolatile memory. The memory 310 can store instructions and applications used by the controller 304 to control driving of the LED array by the driver 306 based on particular profiles also stored therein. The instructions can take into account input from the various sensors 308 as well as from the camera 306.

The controller 304 may be any microprocessor capable of executing instructions (sequential or otherwise) that specify actions to be taken. The system 300 may contain logic and various components and modules on which the controller 304 may operate, as described above. Modules and components are tangible entities (e.g., hardware) capable of performing specified operations and may be configured or arranged in a certain manner. In an example embodiment, circuits may be arranged (e.g., internally or with respect to external entities such as other circuits) in a specified manner as a module. The controller 304 may be configured by firmware or software (e.g., instructions, an application portion, or an application) as a module that operates to perform specified operations. In an example embodiment, the software may reside on a machine readable medium, such as a non-statutory machine readable medium. In an example embodiment, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may, accordingly, configure a hardware processor, for example, to constitute a particular module at one instance of time and to constitute a different module at a different instance of time.

In operation, in some embodiments, illumination from all of the pixels of the LED array 302 may be adjusted or deactivated. In operation, in some embodiments, the intensity of illumination of the pixels may be reduced by a significant predetermined percentage, such as between about 10 percent and about 90 percent. In some embodiments, the adjustment can occur for a predetermined amount of time or until manually overridden. Regardless of whether illumination from all, or merely some, of the pixels of the LED array 302 are adjusted, illumination from some or all of the other pixels (within the same LED army, if present, or in the separate LED array) may or may not also be adjusted. That is, some or all the other pixels, may be activated, if inactive when the pixels are active, the intensity of illumination of the other pixels may be increased by a significant predetermined percentage, such as between about 10 percent and about 90 percent), or the intensity of illumination of the other pixels may be unaffected by adjustment of the pixels. In the latter case, the other pixels may thus provide light at the same time and in the same place as light from the pixels.

In some embodiments, beam focus or steering in the LED array 302 can be performed electronically with a monolithic array of pixels, by activation of one or more subsets of the pixels, to permit dynamic adjustment of the beam shape without moving optics or changing the focus of the lens in the lighting apparatus. Such an embodiment, for example, may be based on different optics (with different characteristics) being provided for the different subsets of the pixels. In other embodiments, the beam focus or steering can be based on both activation of one or more subsets of the pixels and movement/focal change of the optics. As described, the beam shaping may be activated using manual interaction with the light apparatus, such as activation of a switch or button. In addition, or instead, the beam shaping may be activated using feedback from the environment detected by one or more sensors in the lighting apparatus. Examples of such feedback include, but are not limited to, distance to the object being illuminated and/or ambient lighting, audible commands (as determined using voice recognition software), or electronically entered using a remote source, e.g., a smartphone, using an App if the lighting apparatus is able to communicate wirelessly.

Light emitting matrix pixel arrays and lens systems such as described herein may support various other beam steering or other applications that benefit from fine-grained intensity, spatial, and temporal control of light distribution. This may include, but is not limited to, precise spatial patterning of emitted light from pixel blocks or individual pixels. Depending on the application, emitted light may be spectrally distinct, adaptive over time, and/or environmentally responsive. The light emitting pixel arrays may provide pre-programmed light distribution in various intensity, spatial, or temporal patterns. Associated optics may be distinct at a pixel, pixel block, or device level. An example light emitting pixel array may include a device having a commonly controlled central block of high intensity pixels with an associated common optic, whereas edge pixels may have individual optics. In addition to flashlights, common applications supported by light emitting pixel arrays include video lighting, automotive headlights, architectural and area illumination, and street lighting.

For example, light emitting matrix pixel arrays may be used to selectively and adaptively illuminate buildings or areas for improved visual display or to reduce lighting costs. In addition, light emitting pixel arrays may be used to project media facades for decorative motion or video effects. In conjunction with tracking sensors and/or cameras, selective illumination of areas around pedestrians may be possible. Spectrally distinct pixels may be used to adjust the color temperature of lighting, as well as support wavelength specific horticultural illumination.

Street lighting is an important application that may greatly benefit from use of light emitting pixel arrays. A single type of light emitting array may be used to mimic various streetlight types, allowing, for example, switching between a Type I linear streetlight and a Type IV semicircular street light by appropriate activation or deactivation of selected pixels. In addition, street lighting costs may be lowered by adjusting light beam intensity or distribution according to environmental conditions, presence or absence of pedestrians as identified by facial recognition, or time of use. For example, light intensity and area of distribution may be reduced when pedestrians are not present. If pixels of the light emitting pixel array are spectrally distinct, the color temperature of the light may be adjusted according to respective daylight, twilight, or night conditions.

Vehicle headlamps are another light emitting array application that requires large pixel numbers and a high data refresh rate. Automotive headlights that actively illuminate only selected sections of a roadway can used to reduce problems associated with glare or dazzling of oncoming drivers. Using infrared cameras as sensors, light emitting pixel arrays activate only those pixels needed to illuminate the roadway, while deactivating pixels that may dazzle pedestrians or drivers of oncoming vehicles. In some embodiments, off-road pedestrians, animals, or signs may be selectively illuminated to improve driver environmental awareness. If pixels of the light emitting pixel array are spectrally distinct, the color temperature of the light may be adjusted according to respective daylight, twilight, or night conditions.

Figure 4:
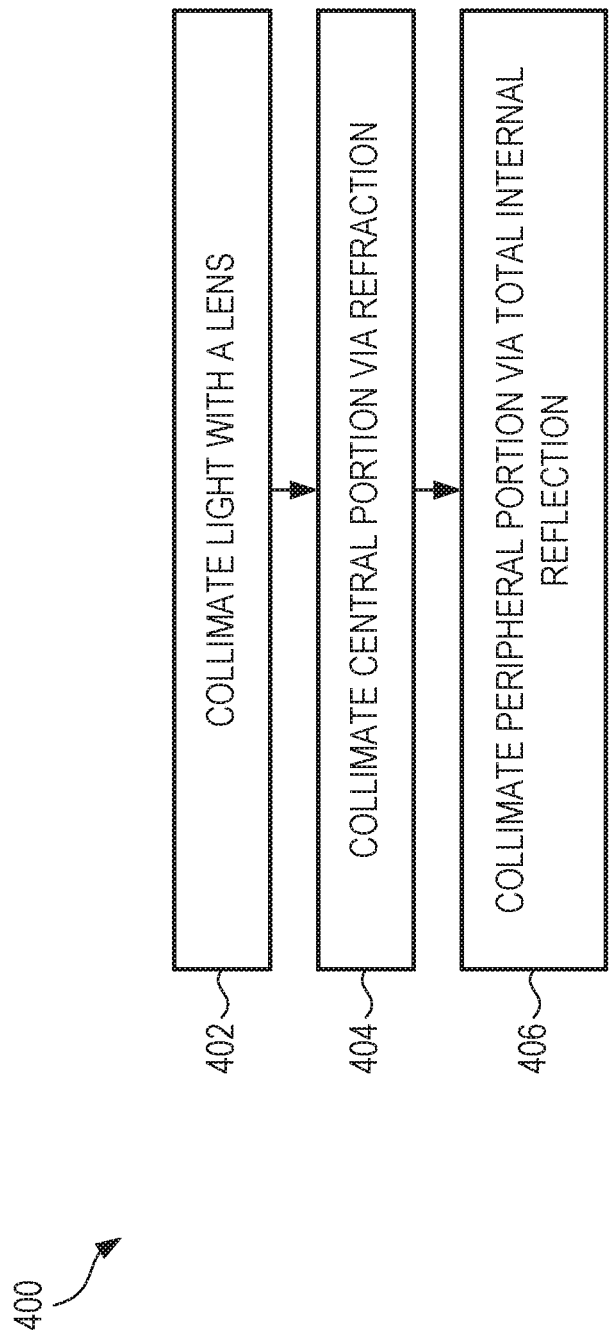
FIG. 4 shows a flow chart of an example of a method for providing illumination, in accordance with some embodiments.

FIG. 4 shows a flow chart of an example of a method 400 for providing illumination, in accordance with some embodiments. The method 400 can be executed by the illumination system 100 of FIGS. 1 and 2, or on other suitable illumination system. The method 400 is but one example of a method for providing illumination; other suitable methods can also be used.

At operation 402, a lens can substantially collimate light that is emitted from a location on a light source. The emitted light can have a central light portion and a peripheral light portion adjacent to the central light portion. The lens can have a first surface that faces the light source and a second surface opposite the first surface. The first surface can include a first convex central portion and a first TIR portion adjacent to the first convex central portion. The second surface can include a second convex central portion and a second TIR portion adjacent to the second convex central portion.

At operation 404, the lens can substantially collimate the central light portion via refraction at the first convex central portion and refraction at the second convex central portion.

At operation 406, the lens can substantially collimate the peripheral light portion via total internal reflection at the first TIR portion and total internal reflection at the second TIR portion.

The method 400 can optionally further include directing, via refraction at the first convex central portion, the central light portion toward the second convex central portion as central internal light.

The method 400 can optionally further include directing, via refraction at the second convex central portion, the central internal light out of the lens to form central exiting light.

The method 400 can optionally further include reflecting, via total internal reflection at the first TIR portion, the peripheral light portion toward the second TIR portion as peripheral internal light.

The method 400 can optionally further include reflecting, via total internal reflection at the second TIR portion, the peripheral internal light to form peripheral exiting light that exits the lens and is substantially parallel to the central exiting light.

In some examples, the first convex central portion can have a radius of curvature between about 0.5 mm and about 3.0 mm and has a conic constant less than or equal to −0.5. In some examples, the second convex central portion can have a radius of curvature between about 0.5 mm and about 3.0 mm and has a conic constant less than or equal to −0.5.

While exemplary embodiments of the present disclosed subject matter have been shown and described herein, it will be obvious to those skilled in the art that such embodiments are provided by way of example only. Numerous variations, changes, and substitutions will now occur to those skilled in the art, upon reading and understanding the material provided herein, without departing from the disclosed subject matter. It should be understood that various alternatives to the embodiments of the disclosed subject matter described herein may be employed in practicing the various embodiments of the subject matter. It is intended that the following claims define the scope of the disclosed subject matter and that methods and structures within the scope of these claims and their equivalents be covered thereby.

It will thus be evident that various modifications and changes may be made to these aspects without departing from the broader scope of the present disclosure. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single aspect for the purpose of streamlining the disclosure. This method of disclosure is not to be interpreted as reflecting an intention that the claimed aspects require more features than are expressly recited in each claim. Rather, as the following claims reflect, inventive subject matter lies in less than all features of a single disclosed aspect. Thus, the following claims are hereby incorporated into the Detailed Description, with each claim standing on its own as a separate aspect.

While only certain features of the system and method have been illustrated and described herein, many modifications and changes will occur to those skilled in the art. It is, therefore, to be understood that the appended claims are intended to cover all such modifications and changes. Method operations can be performed substantially simultaneously or in a different order.

To further illustrate the systems and related methods disclosed herein, a non-limiting list of examples is provided below. Each of the following non-limiting examples can stand on its own or can be combined in any permutation or combination with any one or more of the other examples.

In Example 1, an illumination system can include: a lens configured to substantially collimate light that is emitted from a location on a light source, the emitted light having a central light portion and a peripheral light portion adjacent to the central light portion, the lens having a first surface configured to face the light source and a second surface opposite the first surface, the first surface including a first convex central portion and a first total internal reflection (TIR) portion adjacent to the first convex central portion, the second surface including a second convex central portion and a second TIR portion adjacent to the second convex central portion, the first convex central portion and the second convex central portion being shaped to substantially collimate the central light portion via refraction at the first convex central portion and refraction at the second convex central portion, the first TIR portion and the second TIR portion being shaped to substantially collimate the peripheral light portion via total internal reflection at the first TIR portion and total internal reflection at the second TIR portion.

In Example 2, the illumination system of Example 1 can optionally be configured such that: a central axis of the lens extends through a center of the first convex central portion and a center of the second convex central portion; the first TIR portion has a cross-section, taken in a plane that includes the central axis, that includes a plurality of first serrations; and the second TIR portion has a cross-section, taken in the plane, that includes a plurality of second serrations.

In Example 3, the illumination system of any one of Examples 1-2 can optionally be configured such that: a first serration of the plurality of first serrations includes a first apex and a first pair of opposing sides that each extend from the first apex toward the second surface of the lens; the first pair of opposing sides is angled such that light in the peripheral light portion enters the lens via refraction at a first opposing side of the first pair of opposing sides and is directed toward the second TIR portion via total internal reflection at a second opposing side of the first pair of opposing sides; a second serration of the plurality of second serrations includes a second apex and a second pair of opposing sides that each extend from the second apex toward the first surface of the lens; the second pair of opposing sides is angled such that light in the peripheral light portion reflects via total internal reflection at first opposing side of the second pair of opposing sides and is directed out of the lens via refraction at a second opposing side of the second pair of opposing sides.

In Example 4, the illumination system of any one of Examples 1-3 can optionally be configured such that the plurality of first serrations include apexes that lie on a virtual surface that is concave when viewed in the cross-section.

In Example 5, the illumination system of any one of Examples 1-4 can optionally be configured such that the plurality of second serrations include apexes that lie on a virtual surface that is generally planar when viewed in the cross-section.

In Example 6, the illumination system of any one of Examples 1-5 can optionally be configured such that: the first convex central portion is configured to direct, via refraction at the first convex central portion, the central light portion toward the second convex central portion as central internal light; the second convex central portion is configured to direct, via refraction at the second convex central portion, the central internal light out of the lens to form central exiting light; the first TIR portion is configured to reflect, via total internal reflection at the first TIR portion, the peripheral light portion toward the second TIR portion as peripheral internal light; and the second TIR portion is configured to reflect, via total internal reflection at the second TIR portion, the peripheral internal light to form peripheral exiting light that exits the lens and is substantially parallel to the central exiting light.

In Example 7, the illumination system of any one of Examples 1-6 can optionally be configured such that: the lens is circular; the first TIR portion surrounds the first convex central portion; and the second TIR portion surrounds the second convex central portion.

In Example 8, the illumination system of any one of Examples 1-7 can optionally be configured such that the lens is rotationally symmetric about a central axis that extends through a center of the first convex central portion and a center of the second convex central portion.

In Example 9, the illumination system of any one of Examples 1-8 can optionally be configured such that: the first convex central portion has a radius of curvature between about 0.5 mm and about 3.0 mm and has a conic constant less than or equal to −0.5; and the second convex central portion has a radius of curvature between about 0.5 mm and about 3.0 mm and has a conic constant less than or equal to −0.5.

In Example 10, the illumination system of any one of Examples 1-9 can optionally further include the light source, the light source comprising an array of light-emitting diodes.

In Example 11, the illumination system of any one of Examples 1-10 can optionally be configured such that: the array of light-emitting diodes is rectangular; the array includes a first length along a first edge of the array, a second length along a second edge of the array that is adjacent to the first edge of the array, and a diagonal length extending diagonally across the array; the first length and the second length are less than an outer diameter of the first convex central portion and less than an outer diameter of the second convex central portion; and the diagonal length is greater than the outer diameter of the first convex central portion and greater than the outer diameter of the second convex central portion.

In Example 12, the illumination system of any one of Examples 1-11 can optionally further include a controller configured to selectively power the light-emitting diodes of the array, the light-emitting diodes of the array being individually addressable.

In Example 13, the illumination system of any one of Examples 1-12 can optionally be configured such that the controller is configured to select from one of a specified plurality of subsets of the light-emitting diodes, the subsets corresponding to different angular distributions of the central light portion and the peripheral light portion.

In Example 14, a method for providing illumination can include: substantially collimating, with a lens, light that is emitted from a location on a light source, the emitted light having a central light portion and a peripheral light portion adjacent to the central light portion, the lens having a first surface that faces the light source and a second surface opposite the first surface, the first surface including a first convex central portion and a first total internal reflection (TIR) portion adjacent to the first convex central portion, the second surface including a second convex central portion and a second TIR portion adjacent to the second convex central portion, substantially collimating the central light portion via refraction at the first convex central portion and refraction at the second convex central portion; and substantially collimating the peripheral light portion via total internal reflection at the first TIR portion and total internal reflection at the second TIR portion.

In Example 15, the method of Example 14 can optionally further include: directing, via refraction at the first convex central portion, the central light portion toward the second convex central portion as central internal light; directing, via refraction at the second convex central portion, the central internal light out of the lens to form central exiting light; reflecting, via total internal reflection at the first TIR portion, the peripheral light portion toward the second TIR portion as peripheral internal light; and reflecting, via total internal reflection at the second TIR portion, the peripheral internal light to form peripheral exiting light that exits the lens and is substantially parallel to the central exiting light.

In Example 16, the method of any one of Examples 14-15 can optionally be configured such that: the first convex central portion has a radius of curvature between about 0.5 mm and about 3.0 mm and has a conic constant less than or equal to −0.5; and the second convex central portion has a radius of curvature between about 0.5 mm and about 3.0 mm and has a conic constant less than or equal to −0.5.

In Example 17, an illumination system can include: an array of light-emitting diodes configured to emit emitted light from a location on the array of light-emitting diodes, the emitted light having a central light portion and a peripheral light portion adjacent to the central light portion; and a lens configured to substantially collimate the emitted light, the lens having a first surface configured to face the array of light-emitting diodes and a second surface opposite the first surface, the first surface including a first convex central portion and a first total internal reflection (TIR) portion surrounding the first convex central portion, the second surface including a second convex central portion and a second TIR portion surrounding the second convex central portion, the first convex central portion being configured to direct, via refraction at the first convex central portion, the central light portion toward the second convex central portion as central internal light, the second convex central portion being configured to direct, via refraction at the second convex central portion, the central internal light out of the lens to form central exiting light, the first TIR portion being configured to reflect, via total internal reflection at the first TIR portion, the peripheral light portion toward the second TIR portion as peripheral internal light, the second TIR portion being configured to reflect, via total internal reflection at the second TIR portion, the peripheral internal light to form peripheral exiting light that exits the lens and is substantially parallel to the central exiting light.

In Example 18, the illumination system of Example 17 can optionally be configured such that: a central axis of the lens extends through a center of the first convex central portion and a center of the second convex central portion; the first TIR portion has a cross-section, taken in a plane that includes the central axis, that includes a plurality of first serrations; the second TIR portion has a cross-section, taken in the plane, that includes a plurality of second serrations; a first serration of the plurality of first serrations include a first apex and a first pair of opposing sides that extend from the first apex toward the second surface of the lens and form an acute angle therebetween; the first pair of opposing sides is angled such that light in the peripheral light portion enters the lens via refraction at a first opposing side of the first pair of opposing sides and is directed toward the second TIR portion via total internal reflection at a second opposing side of the first pair of opposing sides; a second serration of the plurality of second serrations include a second apex and a second pair of opposing sides that extend from the second apex toward the first surface of the lens form an acute angle therebetween; the second pair of opposing sides is angled such that light in the peripheral light portion reflects via total internal reflection at a first opposing side of the second pair of opposing sides and is directed out of the lens via refraction at a second opposing side of the second pair of opposing sides.

In Example 19, the illumination system of any one of Examples 17-18 can optionally further include a controller configured to selectively power the light-emitting diodes of the array, the light-emitting diodes of the array being individually addressable, the controller being further configured to select from one of a specified plurality of subsets of the light-emitting diodes, the subsets corresponding to different angular distributions of the central light portion and the peripheral light portion.

In Example 20, the illumination system of any one of Examples 17-19 can optionally be configured such that: the first convex central portion has a radius of curvature between about 0.5 mm and about 3.0 mm and has a conic constant less than or equal to −0.5; and the second convex central portion has a radius of curvature between about 0.5 mm and about 3.0 mm and has a conic constant less than or equal to −0.5.

What is claimed is:
1. An illumination system, comprising:
a lens configured to substantially collimate light that is emitted from a location on a light source, the emitted light having a central light portion and a peripheral light portion adjacent to the central light portion,
the lens having a first surface configured to face the light source and a second surface opposite the first surface,
the first surface including a first convex central portion and a first total internal reflection (TIR) portion adjacent to the first convex central portion,
the second surface including a second convex central portion and a second TIR portion adjacent to the second convex central portion,
the first convex central portion being configured to direct, via refraction at the first convex central portion, the central light portion toward the second convex central portion as central internal light,
the second convex central portion being configured to direct, via refraction at the second convex central portion, the central internal light out of the lens to form collimated central exiting light,
the first TIR portion being configured to reflect, via total internal reflection at the first TIR portion, the peripheral light portion toward the second TIR portion as peripheral internal light,
the second TIR portion being configured to reflect, via total internal reflection at the second TIR portion, the peripheral internal light to form collimated peripheral exiting light that exits the lens and is substantially parallel to the collimated central exiting light.
2. The illumination system of claim 1, wherein:
a central axis of the lens extends through a center of the first convex central portion and a center of the second convex central portion;
the first TIR portion has a cross-section, taken in a plane that includes the central axis, that includes a plurality of first serrations; and
the second TIR portion has a cross-section, taken in the plane, that includes a plurality of second serrations.
3. The illumination system of claim 2, wherein:
a first serration of the plurality of first serrations includes a first apex and a first pair of opposing sides that each extend from the first apex toward the second surface of the lens;
the first pair of opposing sides is angled such that light in the peripheral light portion enters the lens via refraction at a first opposing side of the first pair of opposing sides and is directed toward the second TIR portion via total internal reflection at a second opposing side of the first pair of opposing sides;
a second serration of the plurality of second serrations includes a second apex and a second pair of opposing sides that each extend from the second apex toward the first surface of the lens;
the second pair of opposing sides is angled such that light in the peripheral light portion reflects via total internal reflection at first opposing side of the second pair of opposing sides and is directed out of the lens via refraction at a second opposing side of the second pair of opposing sides.

4. The illumination system of claim 2, wherein the plurality of first serrations include apexes that lie on a virtual surface that is concave when viewed in the cross-section.

5. The illumination system of claim 2, wherein the plurality of second serrations include apexes that lie on a virtual surface that is generally planar when viewed in the cross-section.

6. The illumination system of claim 1, wherein:
the lens is circular;
the first TIR portion surrounds the first convex central portion; and
the second TIR portion surrounds the second convex central portion.

7. The illumination system of claim 1, wherein the lens is rotationally symmetric about a central axis that extends through a center of the first convex central portion and a center of the second convex central portion.

8. The illumination system of claim 1, wherein:
the first convex central portion has a radius of curvature between about 0.5 mm and about 3.0 mm and has a conic constant less than or equal to −0.5; and
the second convex central portion has a radius of curvature between about 0.5 mm and about 3.0 mm and has a conic constant less than or equal to −0.5.

9. The illumination system of claim 1, further comprising the light source, the light source comprising an array of light-emitting diodes.

10. The illumination system of claim 9, wherein:
the array of light-emitting diodes is rectangular;
the array includes a first length along a first edge of the array, a second length along a second edge of the array that is adjacent to the first edge of the array, and a diagonal length extending diagonally across the array;
the first length and the second length are less than an outer diameter of the first convex central portion and less than an outer diameter of the second convex central portion; and
the diagonal length is greater than the outer diameter of the first convex central portion and greater than the outer diameter of the second convex central portion.

11. The illumination system of claim 9, further comprising a controller configured to selectively power the light-emitting diodes of the array, the light-emitting diodes of the array being individually addressable.

12. The illumination system of claim 11, wherein the controller is configured to select from one of a specified plurality of subsets of the light-emitting diodes, the subsets corresponding to different angular distributions of the central light portion and the peripheral light portion.

13. A method for providing illumination, the method comprising:
substantially collimating, with a lens, light that is emitted from a location on a light source, the emitted light having a central light portion and a peripheral light portion adjacent to the central light portion, the lens having a first surface that faces the light source and a second surface opposite the first surface, the first surface including a first convex central portion and a first total internal reflection (TIR) portion adjacent to the first convex central portion, the second surface including a second convex central portion and a second TIR portion adjacent to the second convex central portion;
directing, via refraction at the first convex central portion, the central light portion toward the second convex central portion as central internal light;
directing, via refraction at the second convex central portion, the central internal light out of the lens to form collimated central exiting light;
reflecting, via total internal reflection at the first TIR portion, the peripheral light portion toward the second TIR portion as peripheral internal light; and
reflecting, via total internal reflection at the second TIR portion, the peripheral internal light to form collimated peripheral exiting light that exits the lens and is substantially parallel to the collimated central exiting light.

14. The method of claim 13, wherein:
the first convex central portion has a radius of curvature between about 0.5 mm and about 3.0 mm and has a conic constant less than or equal to −0.5; and
the second convex central portion has a radius of curvature between about 0.5 mm and about 3.0 mm and has a conic constant less than or equal to −0.5.

15. An illumination system, comprising:
an array of light-emitting diodes configured to emit emitted light from a location on the array of light-emitting diodes, the emitted light having a central light portion and a peripheral light portion adjacent to the central light portion; and
a lens configured to substantially collimate the emitted light,
the lens having a first surface configured to face the array of light-emitting diodes and a second surface opposite the first surface,
the first surface including a first convex central portion and a first total internal reflection (TIR) portion surrounding the first convex central portion,
the second surface including a second convex central portion and a second TIR portion surrounding the second convex central portion,
the first convex central portion being configured to direct, via refraction at the first convex central portion, the central light portion toward the second convex central portion as central internal light,
the second convex central portion being configured to direct, via refraction at the second convex central portion, the central internal light out of the lens to form central exiting light,
the first TIR portion being configured to reflect, via total internal reflection at the first TIR portion, the peripheral light portion toward the second TIR portion as peripheral internal light,
the second TIR portion being configured to reflect, via total internal reflection at the second TIR portion, the peripheral internal light to form peripheral exiting light that exits the lens and is substantially parallel to the central exiting light.

16. The illumination system of claim 15, wherein:
a central axis of the lens extends through a center of the first convex central portion and a center of the second convex central portion;
the first TIR portion has a cross-section, taken in a plane that includes the central axis, that includes a plurality of first serrations;
the second TIR portion has a cross-section, taken in the plane, that includes a plurality of second serrations;
a first serration of the plurality of first serrations include a first apex and a first pair of opposing sides that extend from the first apex toward the second surface of the lens and form an acute angle therebetween;

the first pair of opposing sides is angled such that light in the peripheral light portion enters the lens via refraction at a first opposing side of the first pair of opposing sides and is directed toward the second TIR portion via total internal reflection at a second opposing side of the first pair of opposing sides;

a second serration of the plurality of second serrations include a second apex and a second pair of opposing sides that extend from the second apex toward the first surface of the lens form an acute angle therebetween;

the second pair of opposing sides is angled such that light in the peripheral light portion reflects via total internal reflection at a first opposing side of the second pair of opposing sides and is directed out of the lens via refraction at a second opposing side of the second pair of opposing sides.

17. The illumination system of claim 15, further comprising a controller configured to selectively power the light-emitting diodes of the array, the light-emitting diodes of the array being individually addressable, the controller being further configured to select from one of a specified plurality of subsets of the light-emitting diodes, the subsets corresponding to different angular distributions of the central light portion and the peripheral light portion.

18. The illumination system of claim 15, wherein:
the first convex central portion has a radius of curvature between about 0.5 mm and about 3.0 mm and has a conic constant less than or equal to −0.5; and
the second convex central portion has a radius of curvature between about 0.5 mm and about 3.0 mm and has a conic constant less than or equal to −0.5.

\* \* \* \* \*